Patented Oct. 12, 1948

2,451,350

UNITED STATES PATENT OFFICE 2,451,350

PREPARATION OF UNSATURATED KETONES

Henry O. Mottern, Hillside, and Vincent F. Mistretta, Fanwood, N. J., assignors to Standard Oil Development Company, a corporation of Delaware No Drawing. Application December 13, 1945, Serial No. 634,883

13 Claims. (Cl. 260—586)

The present invention relates to a process for making unsaturated ketones by the catalytic condensation of two molecules of the same or different ketones in the presence of hydrogen and a specially prepared catalyst.

An object of this invention is to prepare unsaturated ketones by a one-step reaction which, by previous methods, would have required two or more steps.

Another object of this invention is to prepare a catalyst which promotes the reaction between two molecules of the same or different ketones in the presence of hydrogen to yield an unsaturated ketone.

Another and further object of this invention is to make available to the art a process whereby unsaturated ketones can be made economically by one reaction step.

Still another object of this invention is to react two molecules of the same or different ketones in a one-stage process to form an unsaturated ketone substantially directly.

A still further object of this invention is to provide a process for the manufacture of unsaturated ketones, which process may be operated in a continuous manner.

Another object of this invention is to prepare a catalyst which promotes the reaction in the presence of hydrogen between two molecules of the same or different ketones having five or more carbon atoms to yield a mixture of saturated and unsaturated ketones.

Still other objects will be apparent to those skilled in the art from the following detailed description of the invention and from the claims.

Heretofore unsaturated ketones have been made by a variety of methods, among which was the condensation of ketones in the liquid phase using alkaline and alkaline earth catalysts. This method gave as a product a ketonic alcohol which, by the action of a dehydrating agent in a second stage, converted the ketonic alcohol to an unsaturated ketone. These condensations using alkaline and alkaline earth catalysts are equilibrium reactions and the equilibrium becomes fixed in conversion and favors relatively low yields per pass of ketone over the catalyst. Aluminum and zinc amalgams and sodium and potassium amalgams have also been used as catalysts for the condensation of ketones. These last catalysts are subject to the same limitations as the alkaline and alkaline earth catalysts. The condensation of ketones by passing the vapors over solid catalyst prepared from the oxides of zinc, chromium, aluminum, manganese, copper and cadmium has also been disclosed in U. S. Patent No. 1,964,041. The yield of the desired ketone or the first condensation product where the above oxides were used as catalysts, has heretofore been too low for economic feasibility. The yields claimed for the condensation have seldom been over 25 to 30% of the original ketone entering the condensation reaction.

It has now been discovered that unsaturated ketones can be made directly by condensation of two molecules of the same ketone or two molecules of different ketones in the presence of a catalyst prepared by mixing oxides of the second and fifth groups of the periodic system. It has also been discovered that when the above condensation is made using ketones containing five or more carbon atoms that a substantial amount of the condensation product is a saturated ketone. This represents a substantial improvement over the procedures described in the prior art since more substantial yields of the desired product are obtained and a number of unsaturated ketones are made available which previously were not. This invention is practiced by passing the ketone or ketones over the catalyst while in the vapor form. The temperature range at which the vapors are maintained may vary somewhat depending upon the ketone or ketones used but is, in general, within the range of 200 to 600° C. One of the requirements of the temperature chosen is that it be below the decomposition of any reactant present and that it be as far removed as possible from the temperature at which any one of the reactants has a tendency to condense and produce compounds which represent a molecule containing more than two molecules of the original reactant or reactants, an example of a condensation product representing the reaction of three molecules of original reactant being phorone from the condensation of three molecules of acetone.

A further requirement for the practice of this invention is that the vapors of the organic reactant or reactants be mixed with hydrogen before their passage over the catalyst. The hydrogen apparently has the effect of activating the catalyst for condensation of the simple ketone or ketones to the higher unsaturated ketone. Without hydrogen, the amount of condensate is very small due to the low activity of the catalyst, but with hydrogen present in the vapors the amount of the reactant or the reactants condensing to give an unsaturated ketone is substantially increased. The ketone or ketones and hydrogen are preferably kept in mol to mol proportion, but in some instances an increase in the proportion of hydrogen improves the yield of condensate. It has been found that the proportion of hydrogen used can be extended to 10 mols per mol of reactant or reactants.

The catalyst used in this process is prepared by mixing oxides of the second and fifth groups of the periodic system. The oxide chosen from group II may form the major portion of the mixture, that is, it is preferred to have this oxide present in the mixture of oxides in an excess of 50% by weight. It is possible, however, to use greater than 50% by weight of the oxide selected from group V. An example of oxides in amounts of each which give a satisfactory catalyst is 94 parts of zinc oxide and 6 parts of bismuth trioxide. An oxide selected from group II, such as zinc oxide, will catalyze the condensation without the addition of an oxide selected from group V; however, the activity of the single oxide selected from group II is low and it does not give satisfactory yields of the condensate, whereas the activity of the mixed oxides is substantially greater and the active life is much longer. In the preparation of the catalysts the oxides are intimately mixed. One successful method of mixing the oxides is to make an aqueous slurry followed by removal of water and pulverization to yield a dry powdered catalyst. It is preferred to incorporate a mixture of the oxides on to an inert carrier such as diatomaceous earth, bentonite, talc, metallic machine turnings, etc. A catalyst such as a mixture of oxides on steel machine turnings which has been thoroughly dehydrated is satisfactory for the catalyzation of the condensation between the ketone or ketones to form unsaturated and saturated ketones. A catalyst prepared in the above manner does not require the presence of a special dehydration promoting substance such as silica, alumina gel or activated alumina because the catalyst acts to catalyze the condensation of two molecules of a ketone or ketones as well as to catalyze the elimination of water from the first condensation product known as a keto-alcohol, with the result that the product of the reaction is an unsaturated ketone. The catalyst also acts to catalyze the addition of hydrogen to unsaturated ketones having ten carbon atoms or more to yield a saturated ketone.

This invention applies particularly to the ketones, actone, methyl ethyl ketone, methyl n-propyl ketone, methyl isopropyl ketone, methyl n-butyl ketone and methyl isobutyl ketone. The alicyclic ketones, of which cyclopentanone and cyclohexanone are examples, are also condensed in a high yield to dicyclic unsaturated ketones. This invention also applies to aralkyl ketones.

Some of the saturated and unsaturated ketones prepared according to this invention are known chemical compounds, but this process because of the high activity of the catalyst, makes available a number of saturated and unsaturated ketones not properly described and known to the art. The condensation of ketones as accomplished by this invention gives a product of high purity from the reaction zone as compared to processes described by the prior art; for example, methyl ethyl ketone is condensed to 3-methyl, heptene-2 or 3-one 5 in 80 to 85% yield at 750° F. at atmospheric pressure.

The condensation may be made at atmospheric pressure. However, it has been found that the pressure may be raised to several atmospheres without substantially reducing the yield of saturated and unsaturated ketones, and pressures higher than one atmosphere may be desirable when low molecular weight ketones are used.

The reaction may be carried out in any suitable apparatus. The ketone or ketones may be vaporized prior to their entrance into the catalyst chamber or they may be introduced in the liquid form into the catalyst chamber and be vaporized by contact with hot catalyst. Hydrogen may be introduced into the ketone vapor before entering the catalyst chamber or the hydrogen may be introduced into the catalyst chamber along with the liquid ketone or ketones. In all cases, however, it is essential that the mixing of hydrogen with other vapors be conducted in such a manner that the vapors of the reactants are not altered with respect to temperature in such a degree that the desired reaction temperature is not obtained in the catalyst chamber. If desired, suitable provision for passing the incoming materials in heat exchange with the outgoing reaction products can be provided. The catalyst chamber may be connected to a condenser and this unit may be then connected to distillation apparatus, polymerization equipment or other such apparatus, depending upon the subsequent treatment which it is desired to apply to the saturated and unsaturated ketone.

The saturated and unsaturated ketones produced by this invention have a variety of uses; one of which is their use as denaturants; the unsaturated ketones may also be polymerized to give products of high molecular weight or may be subjected to an extreme polymerization and condensation process to yield resins and high molecular weight polymers. Since the unsaturated ketones have two reactant positions, i. e., the ketone group and ethylene bond, they may be used as starting materials in the synthesis of other organic compounds of great variety.

The ketone or ketones are contacted with the catalyst at a rate which may vary widely but the preferred rate is within the range of 0.25-6.0 volumes of liquid ketone per volume of catalyst per hour. When the rate at which the ketone or ketones is passed through the catalyst chamber is low, there is more condensation taking place than when the rate is higher. However, when the rate is substantially lower than 0.25 volume of liquid ketone per volume of catalyst per hour, the products may be the result of the condensation of more than two molecules of starting material and there may be resinification and decomposition of the unsaturated ketone. When the rate is very high, there may be less conversion per pass-through.

The temperature used for the condensation may be between 200 and 600° C., however, the preferred temperature range is from 350 to 450° C. If the temperature rises higher than 600° C., substantial amounts of condensate resulting from the interaction of more than 2 molecules of ketone or ketones may be present in the product with a consequent lowering of the yield of the desired saturated and unsaturated ketone and the presence of products resulting from resinification and decomposition in the condensate.

The amount of condensate formed in the practice of this invention, as represented by the conversion of methyl ethyl ketone to methyl heptenone and acetone to mesityl oxide, is 12 to 25% of the ketone used. The yield of unsaturated ketone is 80 to 90% of the crude condensed material recovered.

The invention is illustrated by the following examples, but it is to be understood that these examples are set forth only for the purpose of illustration and are not to be construed as limiting the invention in any way.

Example 1

A catalyst was prepared by depositing a mixture of a zinc oxide and bismuth trioxide on steel turnings. The above oxides were in the proportion of 94 weight per cent and 6 weight per cent respectively. The coated turnings were dried. The turnings were placed in an iron tube and the catalyst volume was 120 cc. The tube containing the catalyst was heated in a metal bath to 750° F. Methyl ethyl ketone, 99% purity, was dropped into the heated tube and vaporized as it came in contact with the hot catalyst, hydrogen was fed to the tube with the ketone in mol to mol proportions. The temperature of the vapors over the catalyst was held at 750° F. throughout the reaction time. The rate of feed was 1.5 volumes of liquid methyl ethyl ketone per volume of catalyst per hour and the amount of methyl ethyl ketone passed through the tube containing the catalyst was 10.04 mols. The rate at which hydrogen was passed through the catalyst containing tube was 1.6 cubic feet per hour. The following substances were isolated from this pass-through:

|  | Mols |
|---|---|
| Methyl ethyl ketone | 8.349 |
| Crude methyl heptenone | 0.708 |
| Butyl alcohol | 0.276 |

This represents a recovery of 10.040 mols and also represents a mol per cent conversion of methyl ethyl ketone to methyl heptenone of 14.1 per cent. The vapors of the ketonic material were condensed from the hydrogen and the liquid obtained was fractionated to recover the unsaturated ketone and the unchanged methyl ethyl ketone. The crude methyl heptenone recovered by the first fractionation was subjected to careful refractionation with the result that pure methyl heptenone in the amount of 11.3% based on the total methyl ethyl ketone passed through the catalyst tube was obtained.

Example 2

2755 grams (47.55 mols) of acetone was passed through an iron tube containing 120 cc. of the same catalyst as was used in Example 1. The rate of pass-through was 120 cc. per hour. This is one mol of liquid acetone per volume of catalyst per hour. Hydrogen at the rate of 1.2 cubic feet per hour was mixed with the acetone vapors and passed through the catalyst tube. This represents 1 mol of hydrogen per mol of acetone feed. The catalyst tube was heated in a metal bath and held at 750° F. throughout the reaction time. Liquid acetone was dropped on to the solid catalyst. The vapors issued from the catalyst tube were condensed from the hydrogen and the liquid product was fractionated and the following fractions were recovered:

|  | Recovered | Mols Acetone Equiv. | Mol percent | Mol percent Yield |
|---|---|---|---|---|
|  | Grams |  |  |  |
| Acetone | 2109.4 | 36.35 | 76.4 |  |
| M. Oxide | 429.2 | 8.75 | 18.4 | 78.0 |
| Phorone | 106.4 | 2.45 | 5.2 | 22.0 |
| Water | 110.0 |  |  |  |
|  | 2755. | 47.55 |  | 100.0 |

Example 3

Acetone was passed through an iron tube heated in a metal bath to 750° F. which contained a catalyst whose volume was 120 cc. The catalyst was prepared by depositing a mixture of 94 wt. per cent of magnesium oxide and 6 wt. per cent of vanadium pentoxide on steel turnings followed by drying the coated turnings. Liquid acetone was dropped onto the heated catalyst while hydrogen was fed to the catalyst tube in a mol to mol ratio with the acetone. The vapors issuing from the tube were condensed and when the volume of the condensate was 845 cc. the acetone addition was stopped. On distillation of the product, 731.6 cc. of acetone were recovered. By subsequent distillation of the 113.4 cc. of bottoms, 85% was recovered as mesityl oxide which represents 11.4% of the product.

Example 4

A conversion of acetone was made under the same conditions as in Example 3 except that the catalyst was a mixture of 94 weight per cent of barium oxide and 6 weight per cent of vanadium pentoxide deposited on steel turnings and dried. When 870 cc. of product had been condensed the addition of acetone was stopped. Upon distillation of the product 22.5 cc. was left after the acetone had been taken off. 85% of this residue was mesityl oxide which represents 2.2% of the product.

Example 5

A conversion of acetone was made under the same conditions as in Example 3 except that the catalyst was a mixture of 94 weight per cent of barium oxide and 6 weight per cent of bismuth trioxide deposited on steel turnings and dried. After 840 cc. of product had been condensed the addition of acetone was stopped. 41.5 cc. of liquid remained after the acetone had been distilled from the product. 85% of this residue was mesityl oxide which represents 4.2% of the product.

Example 6

Acetone was passed through a catalyst containing tube under the same conditions in Example 3 except that the catalyst was a mixture of 94 weight per cent of magnesium oxide and 6 weight per cent of bismuth trioxide deposited on steel turnings and dried. After 715 cc. of product had been condensed the addition of acetone was stopped. 88 cc. of liquid remained after the acetone had been distilled from the product. 85% of this residual portion was mesityl oxide which represents 10.46% of the product.

Example 7

A catalyst was prepared as in Example 1 and while maintaining the catalyst tube at 750° F. methyl propyl ketone was dropped into the heated tube. The methyl propyl ketone vaporized as it came in contact with the hot catalyst. The rate of feed was one volume of ketone per volume of catalyst per hour. Hydrogen was fed to the tube with the ketone in equimolar amounts. The vapors issuing from the tube were condensed and when the condensate volume was 2325 cc. addition of ketone to the catalyst tube was stopped. Upon distillation of the condensate 2113 cc. of unconverted ketone were recovered and of the remaining high boiling fraction, 193 cc. or 8.3% of the condensate was $C_{10}$ ketone. This fraction was 50% saturated ketone and 50% unsaturated ketone.

This invention contemplates a process for the production of unsaturated ketones wherein a molecule of one ketone is reacted with another molecule of the same ketone. There is also contemplated the production of unsaturated ketones by the reaction of a molecule of one ketone with a molecule of a different ketone. In the latter case, however, the reaction is somewhat complicated as the products would naturally consist of a mixture of unsaturated ketones which represents a reaction of two molecules of each one of the ketones involved, as well as one molecule of one ketone with a molecule of the other ketone. The separation of the unsaturated ketones produced in the latter case is not difficult when two ketones which have a difference of two or more carbons are used because the boiling points of the unsaturated ketones produced are far enough apart so that efficient fractionation can be made.

The process contemplated by this invention can be successfully and economically operated in a continuous manner. Since a large proportion of the ketone or ketones are unchanged by passage through the catalyst chamber, they can be purified from the products of the reaction and recycled to the catalyst chamber with hydrogen to form more unsaturated ketone. The hydrogen which is mixed with the gases entering the catalyst chamber is recovered from the said chamber without any substantial loss in quantity, therefore, upon recycling the unchanged ketone or ketones the hydrogen may also be recycled and very little new hydrogen need be added to the gases entering the catalyst chamber. The products of the reaction are the result of the condensation of at least two molecules of the starting materials and thus have a higher molecular weight and a consequent higher boiling point than the reactants. Therefore, it may not be necessary, in order to separate the products of the reaction from the reactants, to cool the gases issuing from the catalyst chamber below a temperature at which the reaction products would condense to liquids and thus the reactants could always be maintained at a temperature above the temperatures at which they vaporize during the recycling to the catalyst chamber and thus obviate the consumption of a substantial part of the heat required to originally raise the reactant from a liquid to a vapor at a temperature required by the reaction.

What is claimed and desired to secure by Letters Patent is:

1. A process for the reaction of two molecules of a ketone selected from the group consisting of alkyl, saturated cycloaliphatic and aralkyl ketones, which comprises preparing a vaporous mixture consisting of the ketone and hydrogen, reacting the vaporous mixture in the presence of a catalyst consisting of an oxide of a metal selected from group II and an oxide of a metal selected from group V of the periodic table, and cooling the resultant reaction products containing unsaturated ketone.

2. A process according to claim 1 in which the catalyst consists of more than 50% by weight of an oxide of a metal selected from group II and less than 50% by weight of an oxide of a metal selected from group V.

3. A process according to claim 1 in which the two molecules of saturated ketone are molecules of the same ketone.

4. A process according to claim 1 in which the two molecules of saturated ketone are molecules of different ketones.

5. A process according to claim 1 in which the saturated ketone is acetone.

6. A process according to claim 1 in which the saturated ketone is methyl ethyl ketone.

7. A process according to claim 1 in which the saturated ketone is methyl propyl ketone.

8. A process according to claim 1 in which the reaction takes place at a temperature between 200° C. and 600° C.

9. A process according to claim 1 in which the catalyst is contained on an inert carrier.

10. A process according to claim 1 in which at least an equimolecular amount of hydrogen is used with respect to the saturated ketone.

11. A process according to claim 1 in which the catalyst consists of zinc oxide and bismuth oxide.

12. A process according to claim 11 in which the catalyst is contained on steel turnings.

13. A process according to claim 1 in which the saturated ketone molecule contains at least five carbon atoms and in which the product contains saturated and unsaturated ketones.

HENRY O. MOTTERN.
VINCENT F. MISTRETTA.

REFERENCES CITED

The following references are of record in the file of this patent:

UNITED STATES PATENTS

| Number | Name | Date |
|---|---|---|
| 2,183,127 | Vaughn | Dec. 12, 1939 |